(12) United States Patent
Gale et al.

(10) Patent No.: US 9,744,877 B2
(45) Date of Patent: Aug. 29, 2017

(54) VEHICULAR FUEL CELL COOLING SYSTEM

(71) Applicant: FORD GLOBAL TECHNOLOGIES, LLC, Dearborn, MI (US)

(72) Inventors: Allan Roy Gale, Livonia, MI (US); John Peter Bilezikjian, Canton, MI (US); Richard William Kautz, North Branch, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/456,000

(22) Filed: Aug. 11, 2014

(65) Prior Publication Data
US 2016/0039309 A1    Feb. 11, 2016

(51) Int. Cl.
H01M 8/04      (2016.01)
B60L 11/18     (2006.01)
F28D 1/02      (2006.01)
H01M 8/04029   (2016.01)
H01M 8/04007   (2016.01)

(52) U.S. Cl.
CPC .......... B60L 11/1892 (2013.01); F28D 1/02 (2013.01); H01M 8/04029 (2013.01); H01M 8/04074 (2013.01); H01M 2250/20 (2013.01); Y02T 90/32 (2013.01)

(58) Field of Classification Search
CPC .......... H01M 8/0267; H01M 8/04044; H01M 8/04029
See application file for complete search history.

(56) References Cited

U.S. PATENT DOCUMENTS

| | | |
|---|---|---|
| 3,969,145 A | 7/1976 | Grevstad et al. |
| 4,599,055 A | 7/1986 | Dykstra |
| 6,223,844 B1 * | 5/2001 | Greenhill ............ B60L 11/1881 180/65.1 |
| 6,280,867 B1 | 8/2001 | Elias |
| 2009/0096464 A1 * | 4/2009 | Tanaka .............. H01M 8/04559 324/551 |
| 2011/0091782 A1 | 4/2011 | Itoga |
| 2012/0244485 A1 * | 9/2012 | Mikuski .................. F27B 17/00 432/92 |

* cited by examiner

*Primary Examiner* — Olatunji Godo
(74) *Attorney, Agent, or Firm* — David B. Kelley; Brooks Kushman P.C.

(57) ABSTRACT

A cooling system for a vehicular fuel cell utilizes packet pumps to electrically isolate the fuel from a grounded radiator. Fluid in a packet pump is transported from an inlet port to an outlet port in discrete packets. Because these packets are physically separated from one another, electricity does not flow through the fluid from the inlet port to the outlet port. Packet pumps include peristaltic pumps and external gear pumps.

12 Claims, 4 Drawing Sheets

FIG. 1 – PRIOR ART

VEHICULAR FUEL CELL COOLING SYSTEM

TECHNICAL FIELD

This disclosure relates to the field of fuel cell cooling systems. More particularly, the disclosure pertains to a system to electrically isolate a fuel cell from a vehicle radiator.

BACKGROUND

Fuel cells produce electrical power from a fuel, such as hydrogen, and an oxidizer such as airborne oxygen. Fuel cells may be used to propel vehicles by using the electrical energy to power one or more electrical motors to rotate the vehicle wheels. A fuel cell vehicle produces less pollution and less carbon dioxide than vehicles powered by internal combustion engines, particularly if hydrogen is used as the fuel. Fuel cells have advantages over batteries including the ability to refill a fuel tank in less time than would be required to recharge batteries.

FIG. 1 schematically illustrates a cooling system for a vehicular fuel cell. Fuel cell 10 includes alternating anode layers and cathode layers 12 and 14. When provided with fuel and oxidizer, these layers generate a high voltage between a negative terminal 16 and positive terminal 18. One or more inverters (not shown) convert the direct current (DC) voltage difference between terminals 16 and 18 into a three phase alternating current (AC) voltage between the terminals of one or more electrical motors (not shown) to propel the vehicle. Heat is produced as a by-product of generation of electrical power. To dissipate this heat, cooling fluid is circulated around the anode and cathode layers 12 and 14 and through a radiator 20. Electrical motor 22 drives a pressure pump 24 to force the cooling fluid through fuel cell 10, coolant line 26, radiator 20, and coolant line 28.

Radiator 20 is grounded to vehicle structure. The high voltage electrical system is intended to float with respect to the vehicle structure. In other words, the system is designed to electrically isolate terminals 16 and 18 from the vehicle structure. Toward that end, coolant lines 26 and 28 are fabricated from non-conductive materials. However, unless the coolant liquid is also non-conductive, the coolant itself provides a potential electrical connection. Water has desirable properties as a coolant and the electrical conductivity can be made relatively low, but not zero, by de-ionizing. Known non-conductive fluids have less desirable properties as coolants. The impedance of a conductive path is proportional to the length of the path and inversely proportional to the cross sectional area. In order to increase the impedance of the coolant paths between fuel cell 10 and radiator 20, coolant lines 26 and 28 are long and have a small diameter. Packaging these long lines requires considerable space in the vehicle. Also, the pressure required to force fluid through the circuit also increases with line length and decreases with cross sectional area. Therefore, the dimensions that improve electrical isolation increase the pump pressure required to achieve a desired flow rate.

SUMMARY OF THE DISCLOSURE

Packet pumps, such as peristaltic pumps or certain types of gear pumps, transmit fluid from a pump inlet to a pump outlet in discrete volumes which may be called packets. The packets may be physically separated from one another within the pump. If the packets are physically separated by an electrically insulating material, then the pump provides an electrical isolation function in addition to providing the pumping function.

A fuel cell powered vehicle includes a fuel cell, a radiator, and at least one isolator. The radiator may be grounded to the vehicle whereas neither the positive nor the negative terminals of the fuel cell are grounded to the vehicle. The isolator includes a first and a second isolator port and is configured to electrically isolate the first isolator port from the second isolator port while permitting flow of an electrically conductive fluid, such as water, between the first and second isolator ports. The isolator may be a packet pump that, in addition to providing electrical isolation, also forces the fluid to flow between the isolator ports. For example, the isolator may be a peristaltic pump, gear pump, rotary vane pump, etc. The first isolator port is fluidly connected to a cooling port of the fuel cell, for example by a tube. The second isolator port is fluidly connected to radiator port of the radiator, for example by a tube. Since the isolator provides electrical isolation, tubes connecting the isolator ports to the fuel cell and the radiator are not necessarily electrical insulators and need not be artificially long. The cooling loop includes a fluid return path from the radiator to the fuel cell. The fluid return path may include a second isolator. The two isolators may both be pumps driven by a common shaft or by shafts that are driveably connected to one another.

A cooling system, suitable for an electrically charged heat source such as a fuel cell, includes a radiator and first and second packet pumps. One of the packet pumps has an outlet port fluidly connected to an inlet port of the radiator. The other packet pump has an inlet port fluidly connected to an outlet port of the radiator. The packet pumps may be, for example, peristaltic pumps having a tube connecting a pump inlet to a pump outlet, a rotor and at least one roller. The rollers compress the tube at a compression point, separating the fluid at the pump inlet from the fluid at the pump outlet to decrease any electrical path conductivity via the fluid between the pump inlet and the pump outlet. The rollers are attached to the rotor such that the compression point moves as the rotor turns, pushing the fluid in front of the compression point and drawing fluid from behind the compression point. In some embodiments, a second peristaltic pump is integrated with the first peristaltic pump such that they share a common rotor and rollers.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
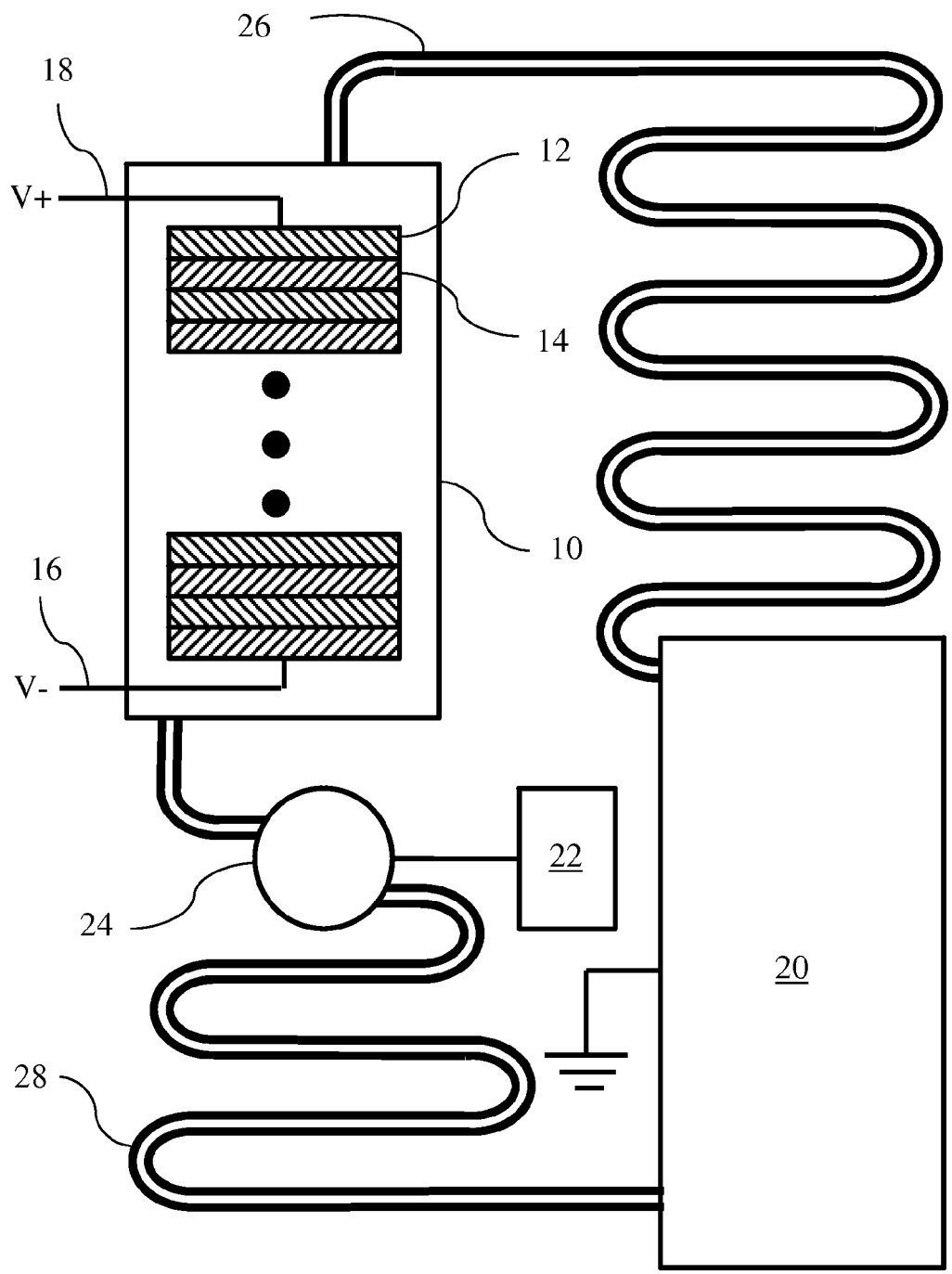
FIG. 1 is a schematic illustration of a vehicular fuel cell cooling system according to the prior art.
Figure 2:
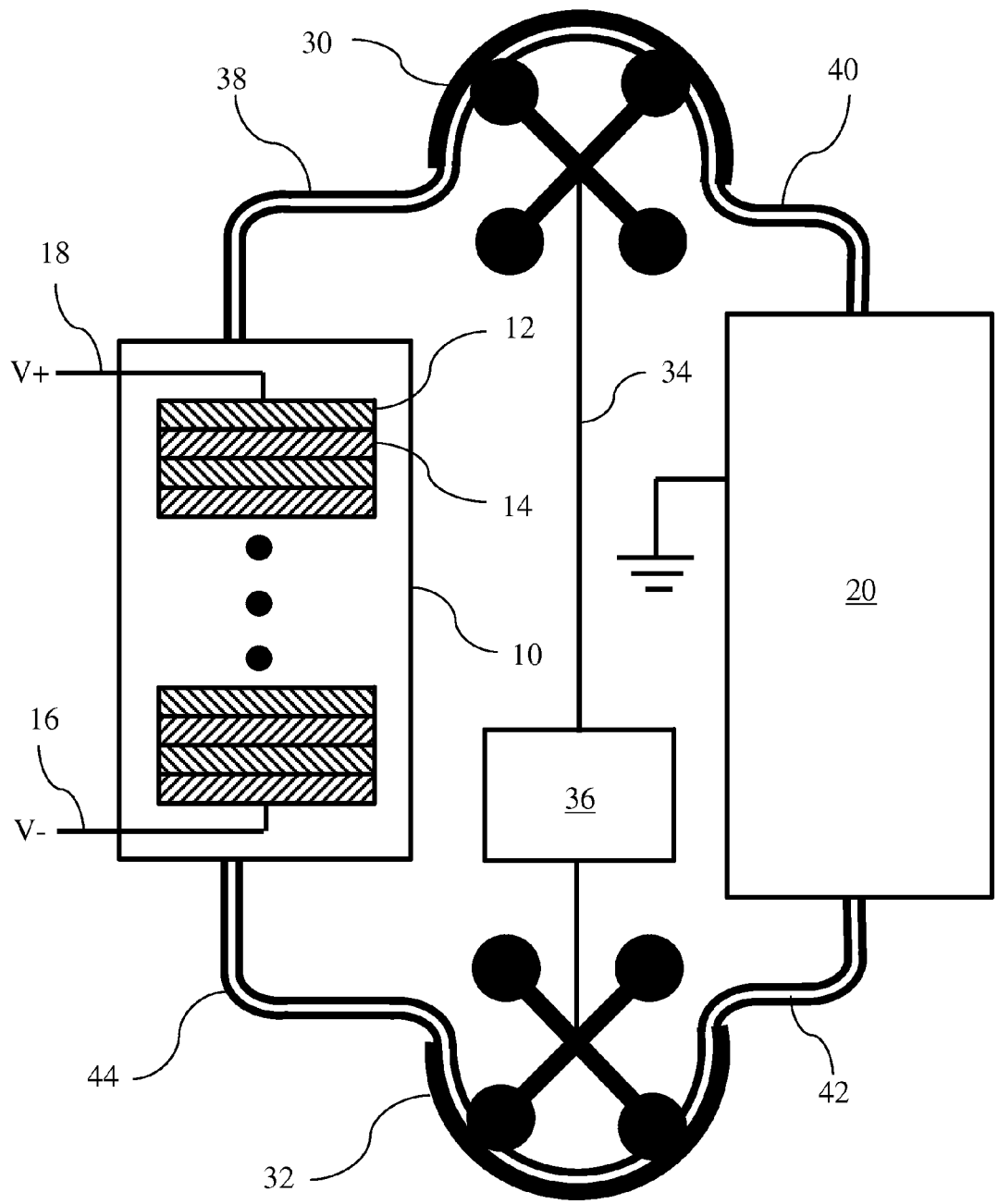
FIG. 2 is a schematic illustration of a vehicular fuel cell cooling system according to the present invention.

FIG. 2 schematically illustrates a cooling system for a vehicular fuel cell using isolators to increase impedance as opposed to long coolant lines. To dissipate this heat, cooling fluid is forced through fuel cell 10 and radiator 20 by peristaltic pumps 30 and 32. Peristaltic pumps 30 and 32 are driven by a common shaft 34 which is driven by electric motor 36. Alternatively, the shafts of pumps 30 and 32 could be driveably connected to one another. Two shafts are driveably connected if rotation of one shaft forces the other shaft to rotate at a proportional speed. The inlet of pump 30 is connected to a first cooling port of fuel cell 10 by coolant line 38 and the outlet of pump 30 is connected to a first radiator port of radiator 20 by coolant line 40. Similarly, the inlet of pump 32 is connected to a second radiator port of radiator 20 by coolant line 42 and the outlet of pump 32 is connected to a second coolant port of fuel cell 10 by cooling line 44. In addition to forcing the coolant through the coolant loop, peristaltic pumps 30 and 32 provide increased electrical isolation in the coolant loop. Therefore, coolant lines 38, 40, 42, and 44 need not be artificially long and do not necessarily need to be fabricated from non-conductive material. Although FIG. 2 shows peristaltic pumps in both the forward and the return fluid lines, use of a peristaltic pump in only one or the other of the forward and return lines provides some of the advantage.

Figure 3:
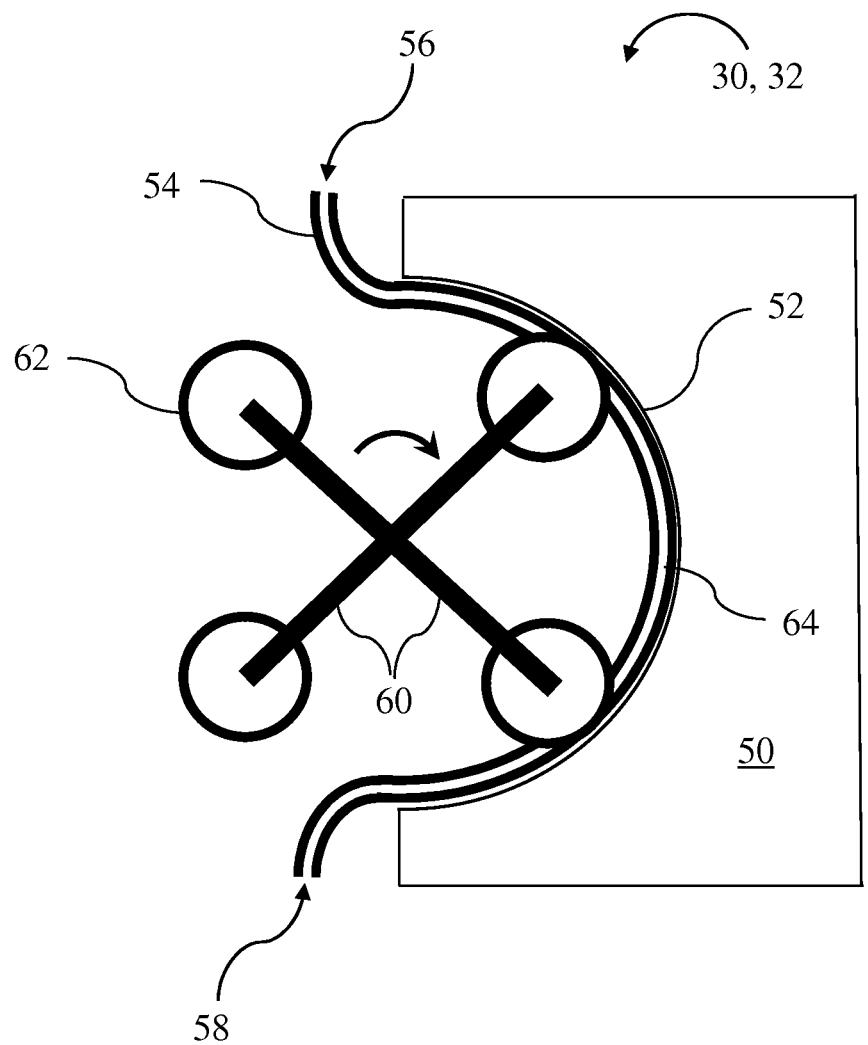
FIG. 3 is a cross sectional view of a peristaltic pump suitable for use in the cooling system of FIG. 2.

FIG. 3 illustrates a peristaltic pump such as pumps 30 and 32 in FIG. 2. A pump housing 50 includes a semi-circular surface 52. A flexible tube 54 having an inlet port 56 and an outlet port 58 rests against the surface 52. Rotor 60 supports a number of rollers 62 which rotate with respect to the rotor. At any given rotor position, at least one of the rollers compresses the flexible tube 54 against the surface 52. As rotor 60 turns, fluid in front of the compression point is forced to move through the tube toward outlet port 58. Fluid behind the compression point is drawn away from inlet port 56. The rollers are spaced apart from one another such that, as the rotor turns, a roller begins compressing the tube near the inlet port before another roller stops compressing the tube near the outlet port. Multiple peristaltic pumps, such as 30 and 32, may share a common housing, rotor, and rollers and have separate tubing.

At the position shown in FIG. 3, a discrete volume of fluid between compression points, called a packet, is separated from the remainder of the fluid. Therefore, electricity cannot flow via the fluid among inlet port 56, packet 64, and outlet port 58. If the tubing is made of non-conductive material, then inlet port 56 is substantially electrically isolated from outlet port 58. Even if the rollers do not completely separate adjacent packets, the drastically reduced cross sectional area of the tubing at the compression point creates very high electrical impedance. The electrical impedance between inlet port 56 and outlet port 58 can be further increased by increasing the number of rollers 62 to create multiple packets of electrically isolated fluid.

Figure 4:
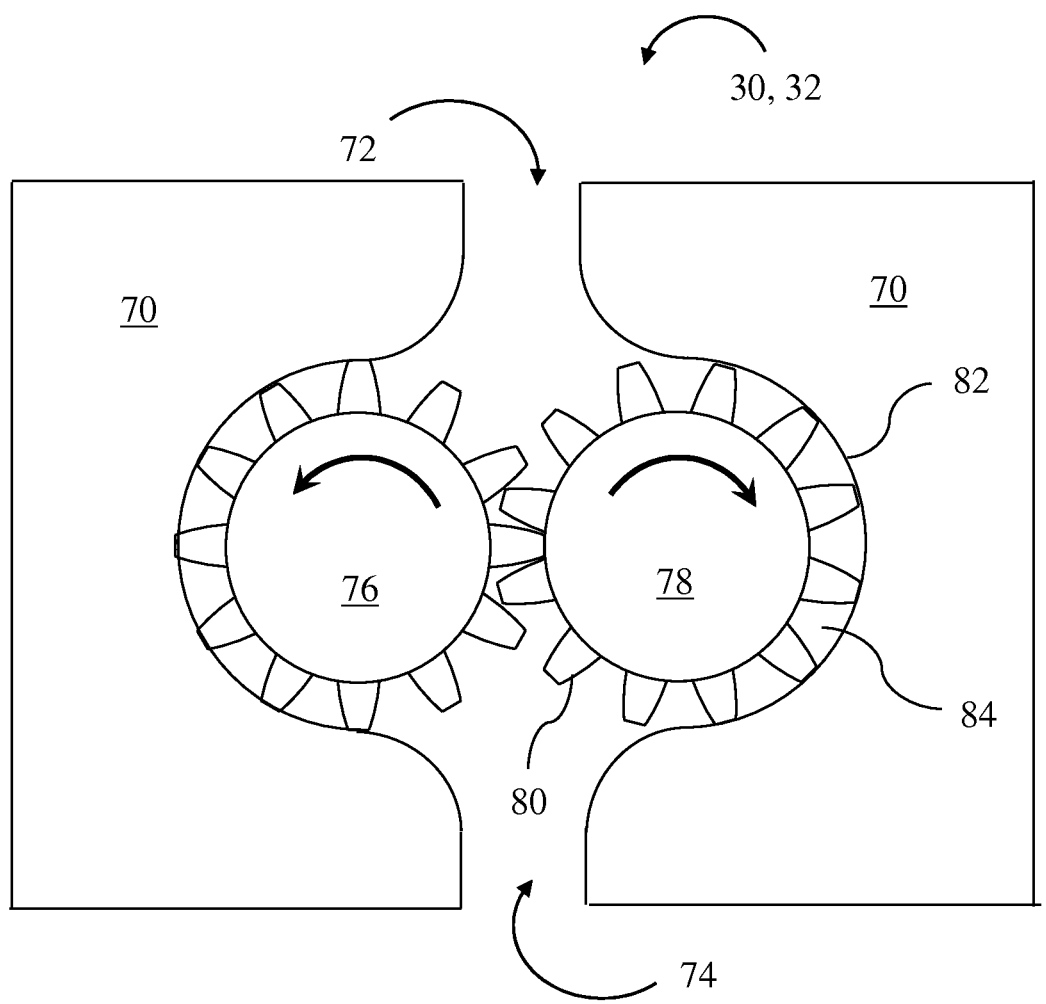
FIG. 4 is a cross sectional view of an external gear pump or isolator suitable for use in the cooling system of FIG. 2.

In some embodiments, one or both of the peristaltic pumps 30 and 32 may be replaced by other types of packet pumps such as the external gear pump illustrated in FIG. 4. A packet pump is a device that separates the fluid into discrete packets and forces the packets of fluid from an inlet port to an outlet port. An external gear pump includes a housing 70 defining an inlet port 72 and an outlet port 74. Two meshing gears 76 and 78 rotate within the housing. One of the gears is typically driven by a shaft that extends out of the housing while the other gear is driven by the meshing action of the gears. The gear teeth 80 closely approach a semi-circular surface 82 of the housing through a portion of each revolution. Packets of fluid 84 are forced from the inlet port to the outlet port as the gears 76 and 78 rotate. A seal is created between the meshing teeth to prevent the fluid from flowing from the outlet port 74 to the inlet port 72 between the gears.

Notice that the packets of fluid 84 between gear teeth and semi-circular surface 82 are separated from the remainder of the fluid. Notice also that the fluid in the inlet port 72 is separated from the fluid in the outlet port 74 by meshing gear teeth. Therefore, current flow via the fluid between the inlet port 72 and outlet port 74 is substantially reduced or eliminated. If the housing 70 and the gears 76 and 78 are made of non-conductive material, then inlet port 72 is electrically isolated from outlet port 74. Even if the interface between meshing gear teeth and between the gear teeth and housing 70 are not perfect, the cross sectional area of any conductive path is drastically reduced creating very high electrical impedance.

The packet pumps described above provide two functions: forcing the fluid to flow and electrically isolating the inlet and outlet ports. In some embodiments, the pumping function may be provided by only one of the two devices 30 and 32 or by another device such as a pressure pump. In such embodiments, one or both of devices 30 and 32 may provide only the isolation function. An isolator is a device that provides electrical isolation while permitting fluid flow, but not necessarily forcing the flow. A device such as the external gear pump of FIG. 4 functions as an isolator when neither gear is driven by an external shaft. In such an embodiment, the gears rotate in response to a pressure drop between the inlet port and the outlet port.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a first isolator having a first isolator port and a second isolator port and configured to electrically isolate the first isolator port from the second isolator port while permitting flow of discrete separated packets of an electrically conductive fluid between the first and second isolator ports;
a second isolator having a third isolator port and a fourth isolator port and configured to electrically isolate the third isolator port from the fourth isolator port while permitting flow of discrete separated packets of the electrically conductive fluid between the third and fourth isolator ports;
a fuel cell having a first cooling port fluidly connected to the first isolator port and a second cooling port fluidly connected to the third isolator port; and
a radiator having a first radiator port fluidly connected to the second isolator port and a second radiator port fluidly connected to the fourth isolator port.

2. The vehicle of claim 1 wherein the first and second isolators are peristaltic pumps.

3. The vehicle of claim 1 wherein: the first isolator is a first packet pump having a first shaft; and the second isolator is a second packet pump having a second shaft driveably connected to the first shaft.

4. The vehicle of claim 1 further comprising a pump configured to circulate coolant among the fuel cell, first isolator, radiator, and second isolator.

5. The vehicle of claim 1 wherein the radiator is electrically grounded to vehicle structure.

6. The vehicle of claim 5 wherein the fuel cell has a negative terminal and a positive terminal and wherein neither the negative terminal nor the positive terminal are grounded to vehicle structure.

7. A vehicle comprising:
a first packet pump having first and second pump ports;
a second packet pump having third and fourth pump ports;
a fuel cell having first and second cooling ports fluidly connected to the first and third pump ports respectively; and
a radiator having first and second radiator ports fluidly connected to the second and fourth pump ports respectively.

8. The vehicle of claim 7 wherein the first packet pump is a peristaltic pump.

9. The vehicle of claim 7 wherein:
the first packet pump has a first shaft; and
the second packet pump has a second shaft driveably connected to the first shaft.

10. A cooling system for a vehicular fuel cell, the system comprising:
a radiator having a radiator inlet and a radiator outlet;
a first packet pump driven by a shaft and configured to separate a fluid into first discrete packets and to force the first discrete packets from a first inlet port to a first outlet port fluidly connected to the radiator inlet; and
a second packet pump driven by the shaft and configured to separate the fluid into second discrete packets and force the second discrete packets from a second inlet port to a second outlet port, wherein the second inlet port is fluidly connected to the radiator outlet.

11. The cooling system of claim 10 wherein the first packet pump is a peristaltic pump comprising:
a first tube connecting the first inlet port to the first outlet port, the tube made of an electrically non-conductive material;
a roller configured to compress the first tube at a compression point to separate fluid at the first inlet port from fluid at the first outlet port; and
a rotor fixed to the shaft and configured to move the compression point in response rotation of the shaft to propel the fluid through the tube.

12. The cooling system of claim 11 wherein the second packet pump is a peristaltic pump comprising:
a second tube connecting the second inlet port to the second outlet port, the tube made of an electrically non-conductive material; and
a roller configured to compress the second tube to separate fluid at the second inlet port from fluid at the second outlet port.

* * * * *